United States Patent [19]

Woollard

[11] Patent Number: 5,212,231
[45] Date of Patent: May 18, 1993

[54] ISOCYANATE CURED POLYSULPHIDE POLYMERS

[75] Inventor: Clive Woollard, Tamworth, England

[73] Assignee: Morton International Limited, Hounslow, England

[21] Appl. No.: 839,517

[22] Filed: Feb. 20, 1992

[30] Foreign Application Priority Data

Feb. 21, 1991 [GB] United Kingdom ............... 9103670
Jan. 3, 1992 [GB] United Kingdom ............... 9200091

[51] Int. Cl.$^5$ ............................................. C08L 75/04
[52] U.S. Cl. ................................. 524/590; 524/589;
528/28; 528/58; 528/76; 525/534; 525/537;
427/385.5
[58] Field of Search ............... 524/590, 589; 528/28,
528/58, 76; 525/534, 537; 427/385.5

[56] References Cited

U.S. PATENT DOCUMENTS 4,349,656  9/1982  Arendt et al. ................ 528/76

OTHER PUBLICATIONS

Roberts et al, *Basic Principles of Organic Chemistry*, 1964, pp. 754–755.

*Primary Examiner*—Maurice J. Welsh
*Attorney, Agent, or Firm*—Wayne E. Nacker; Gerald K. White

[57] ABSTRACT

A polysulphide resin composition is cured by reacting a liquid polysulphide resin with an isocyanate curing agent in the presence of an organometallic or metal salt catalyst, preferably an organotin catalyst such as dibutyltin laurate (DBTL). The compositions have utility in thin films and coatings, and in the bonding, sealing and coating of polycarbonates. Aliphatic isocyanates are preferred for applications where clear coatings are required, the more reactive aromatic isocyanates being preferred for other applications.

43 Claims, 10 Drawing Sheets

ISOCYANATE CURED POLYSULPHIDE POLYMERS

BACKGROUND OF THE INVENTION

1. Field of the Invention

This invention relates to the curing of liquid polysulphide polymers and in particular to the use of isocyanate curing agents to prepare thin films, coatings, adhesives and mouldings of polysulphide polymers and compounds.

2. Description of the Prior Art

Compositions based on liquid polysulphides have a wide range of applications as sealants, strips, sheets, films, spray-on coatings and the like. Many such formulations include carbon black as a filler and reinforcing agent.

Liquid polysulphide resins are usually cured with an oxidising agent such as manganese dioxide, the cure mechanism being as follows:

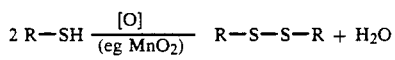

Other mechanisms for polysulphides have been tried. For example, polymers have been made by reacting polysulphides with isocyanates using an amine catalyst. However, water isocyanate reactions were prevalent in these systems, the carbon dioxide produced resulted in a blown product.

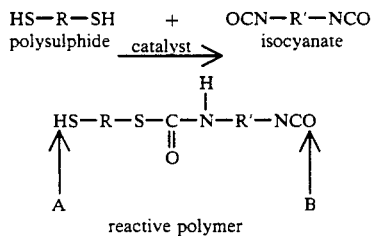

reactive polymer

Subsequently,

A Can react with
  i) further isocyanate
  ii) the reactive end of active polymer (B)

B Can react with
  i) further polysulphide mercaptans
  ii) the unreactive end of reactive polymer (A)
  iii) moisture in the system In amine catalysed systems the isocyanate reacts with water in the atmosphere in preference to the mercaptan groups.

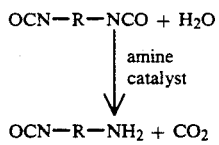

The amino group formed autocatalyses the reaction and an exotherm occurs. With this catalysis the reaction between isocyanate and mercaptan is preferred.

Nevertheless, problems still arise in the preparation of thin films and coatings. In particular the curing reaction can proceed too rapidly and exothermically and is not easily controlled. There is still a potential problem of blowing resulting from reactions between isocyanate groups and water in the system or in the air.

SUMMARY OF THE INVENTION

It is accordingly an object of that invention to produce cured polysulphides with a usefully improved range of properties, particularly in the form of thin films or coatings.

It is a further object of the invention to provide a method of curing liquid polysulphides which has a reduced exotherm and can be easily controlled.

These objects are achieved in accordance with the invention by curing a liquid polysulphide with an isocyanate curing agent in the presence of an ozganometallic or metal salt catalyst. The preferred catalyst is an organotin catalyst such as dibutyl tin dilaurate (DBTL).

The polysulphide compounds of the present invention are found to have greatly enhanced abrasion resistance, greater tensile strength and elastic modulus and improved adhesion to many different types of surface.

The preferred liquid polysulphide (LP) polymers for use in the compositions of the present invention are those of relatively high average molecular weight such as 2500 to 8000 and low degree of branching. A wide range of liquid polysulphide polymers is produced by Morton International Inc., these being formed by the condensation in aqueous suspension of sodium polysulphide with bis-(2-chloroethyl) formal. The average structure of the liquid polymer is:

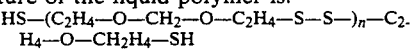

The value of the repeat unit n, which is generally in a range of 5 to 50, governs the viscosity of the LP polymer. A summary of the properties of the Morton International Inc., range of LP polymers is given in the following table:

TABLE 1

| Polymer | Average Molecular Mass | Repeat Unit 'n' Value | % Tri-functional Monomer (mole %) | Average Mercaptan Content (moles/Kg) | Average Viscosity at 25° C. (Pa.s) |
|---|---|---|---|---|---|
| LP-1400C | 1000 | 6 | 0 | 2.06 | 1.15 |
| LP-33 | 1000 | 6 | 0.5 | 1.75 | 1.75 |
| LP-3 | 1000 | 6 | 2 | 2.06 | 1.15 |
| LP-980C | 2600 | 15 | 0.5 | 0.91 | 12.5 |
| LP-977C | 2600 | 15 | 2 | 0.91 | 12.5 |
| LP-541C | 4000 | 23 | 0 | 0.53 | 46.5 |
| LP-12C | 4000 | 23 | 0.2 | 0.53 | 46.5 |
| LP-32C | 4000 | 23 | 0.5 | 0.53 | 46.5 |
| LP-2C | 4000 | 23 | 2 | 0.60 | 46.5 |
| LP-31 | 8000 | 42 | 0.5 | 0.38 | 62.5 |

Of these, the preferred polymer is LP32, which has an average molecular weight of 4000 and a low degree of branching. LP polymers with a high concentration of trifunctional monomer may have a tendency to cyclise, i.e., isocyanate groups tend to react with branched mercaptan groups on the same chain, giving a ring structure and preventing further chain extension. The trifunctional monomer content preferably does not exceed 1 mole %.

The isocyanates used may be aliphatic or aromatic. Aliphatic isocyanates which may be used include hexamethylene diisocyanate (HDI). Among the most widely available aromatic isocyanates are diphenyl methylene, 4,4′, diisocyanate (MDI) and toluene diisocyanate. :

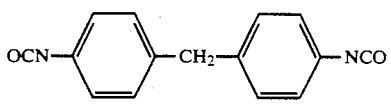

Aromatic isocyanates are preferred owing to their greater reactivity. As in the case of the LP polymer a linear compound with a low degree of trifunctionality is preferred. One particularly suitable MDI formulation meeting this criterion is available from Imperial Chemical Industries Plc under the trade mark Suprasec ® VM021.

The preferred catalysts for the mercaptan/isocyanate reaction are organotin catalysts which favour this reaction rather than that between isocyanate groups and water in the system. The preferred catalyst is dibutyl tin dilaurate (DBTL).

Metal salts which can be used as catalysts in accordance with the invention are usually salts of organic acids such as $C_2$ to $C_8$ carboxylic acids, typically those of tin and those of Group Ia, IIa and IIb metals such as sodium, potassium, calcium and zinc. Those of lead and mercury could also be used, but are regarded as less desirable for reasons of toxicity. Typical examples of metal salt catalysts which can be used include stannous octoate, potassium acetate and calcium and zinc naphthenates.

The compositions of the invention have also been found to be of particular utility in conjunction with polycarbonates, and in particular for coating polycarbonate members such as sheets, bonding such members together or sealing around them.

Polycarbonate sheet is increasingly being used in building applications, in particular for covering or even replacing glass windows. There are relatively few compositions having suitable properties for use as sealants, adhesives and coating compositions for polycarbonate sheet, and there is therefore a need for improved compositions for these purposes having the following properties:

i) high shear strength
ii) high resilience to withstand impact
iii) ease of application
iv) transparency or translucence
v) non stress-crazing of polycarbonate
vi) durability to the environment Polysulphide resins have not hitherto been considered suitable for use in such applications since, although thin films of polysulphides are intrinsically transparent, the conventional curing of liquid polysulphides with inorganic catalysts such as manganese dioxide renders them opaque, with insufficient bond strength.

We have now found that the isocyanate-cured polysulphides of the present invention are particularly suitable for bonding, coating and sealing polycarbonates since they impart good physical properties and form bonding layers which are transparent, or at least translucent, without apparent stress crazing of polycarbonate sheet.

LP32-C is particularly suitable for use with polycarbonates. For faster curing, such as in spraycoating applications, a higher molecular weight polysulphide such as LP-31 can be used.

Aliphatic isocyanates are preferable for polycarbonate applications where adhesives, coatings and sealants are subjected to direct ultra violet light and colour fast properties are required. Where black adhesives, coatings and sealants are specified, where colour-fast properties are non critical of where the product is not subject to direct ultra violet light, an aromatic isocyanate is preferred.

A silane coupling agent may be added to the composition to assist bonding to the polycarbonate.

The composition may be formulated as a one- or two-part composition, depending on the intended application.

BRIEF DESCRIPTION OF THE DRAWINGS

The following examples further illustrate preferred features and applications of the invention. Reference will also be made to the accompanying drawings which illustrate preferred embodiments and features of the invention.

In the drawings.

DETAILED DESCRIPTION OF THE PREFERRED EMBODIMENTS

Figure 1:
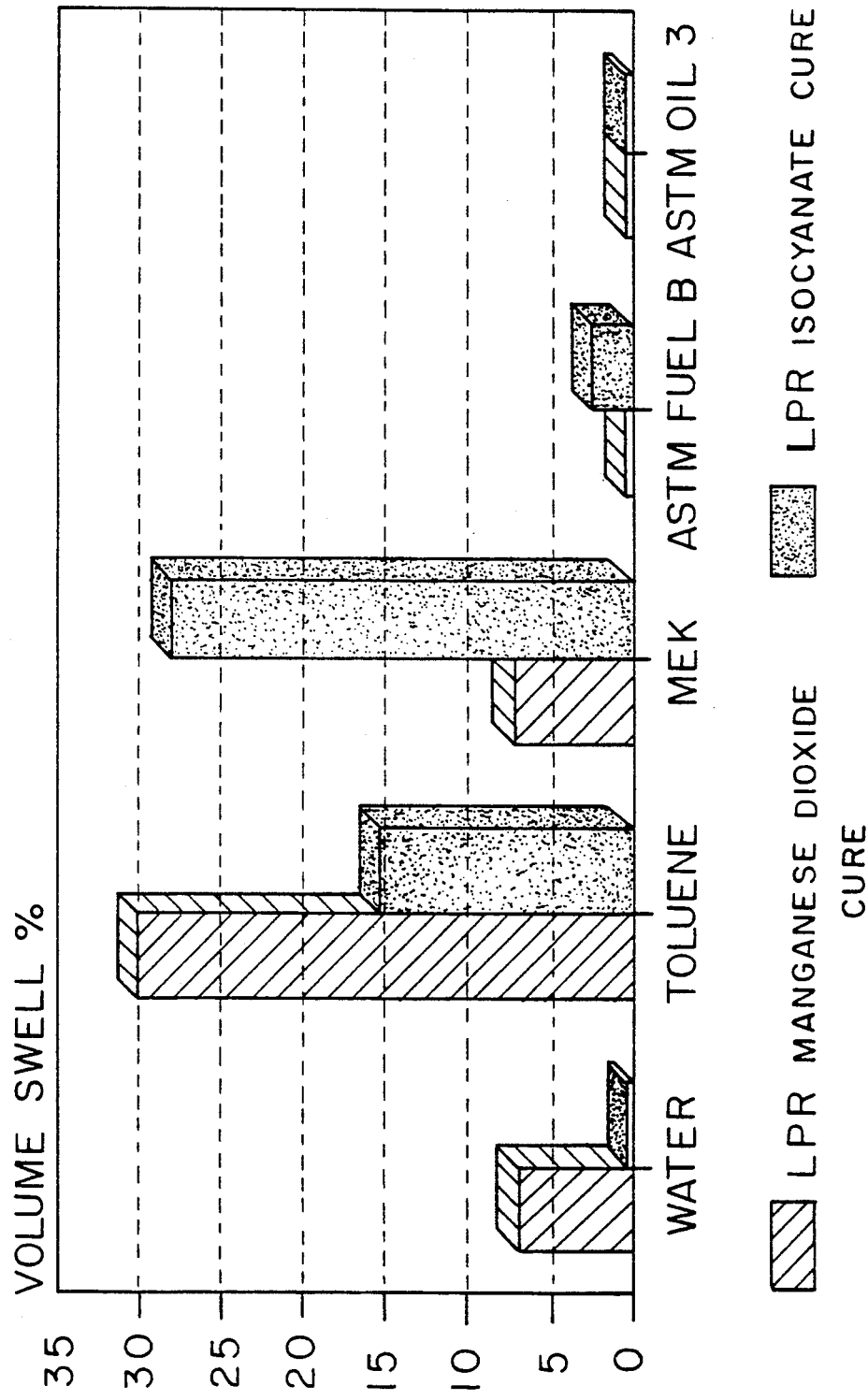
FIG. 1 is a bar chart illustrating the results of volume swell tests described in Example 3.

In the examples, the properties of the test samples were evaluated as follows, unless otherwise indicated: Work life and cure time were calculated using the time to 10% and 90% of cure respectively, as measured by a Monsanto ODR rheometer at 35° C. Tensile strength was measured using 20 mm dumb-bells, pulled at 500 mm per minute at 23° C. Tear strength was measured in accordance with BS (British Standard) 903 part A3 method B. Elongation at break was estimated by measuring elongation between set points 1 cm apart on tensile dumb-bell test pieces. Abrasion was measured using Taber Abrader H18 wheels with 1 kg top mass, recording the weight loss after 1000 cycles. Hardness was measured using a Shore A gauge. Viscosity was measured with a Haake viscometer at 20° C. P II, 16 r.p.m.

EXAMPLE 1

Tests were carried out to establish the most favorable isocyanate index for the composition. This is a measure of the molar ratio of NCO groups to SH groups in the system. A system containing the exact stoichiometric amount of NCO required to react with the available mercaptan groups is defined as having an isocyanate index of 100.

The LP polymer used was LP-32C, having a mercaptan content of 0.53 mole/kg. This corresponds to an SH content of 17.49g in 1000g of LP, or 1.749 wt.%.

The isocyanate used was Suprasec %021, having an average —NCO content of 23.0 wt.%. A system having an isocyanate index of 100 would therefore have an NCO:SH weight ratio of 13.15:1, or 7.605 g of VM021 per 100 g of LP-32C.

Four test samples were produced with different proportions of isocyanate, and their cured properties measured. The samples were cured at room temperature in open moulds, using undried materials. The catalyst was dibutyl tin dilaurate. The proportions used and the results obtained are set out in Table 2.

TABLE 2

|  | TEST 1 | TEST 2 | TEST 3 | TEST 4 |
| --- | --- | --- | --- | --- |
| LP-32C | 100 | 100 | 100 | 100 |
| Suprasec VM021 | 15 | 7 | 10 | 8 |
| DBTL | 0.5 | 0.7 | 1.0 | 2.0 |
| INDEX | 200 | 92 | 130 | 105 |
| CURED APPEARANCE | FOAMED, FLEXIBLE | DID NOT CURE RESIDUAL LP ODOUR | GOOD FILM A SMALL AMOUNT OF BLOWING. | GOOD FILM. NO BLOWING. SLIGHTLY SOFT. RESIDUAL LP ODOUR |
| WORK LIFE (100 g) | OVER 2 HOURS | — | 20 mins | 15 mins |
| CURE TIME | OVERNIGHT | — | 2½ hours | 2½ hours |
| COLOUR | AMBER→ | → | → | →BROWN |

The results suggest a preferred isocyanate index of between 100 and 135 for an unfilled film, more preferably between 110 and 125 and most preferably about 118. This is somewhat higher than is commonly used in polyurethane formulations, but this may be accounted for by moisture in the system.

EXAMPLE 2

Two test formulations were prepared using as the LP polymer vehicle a 100% solids Morton International LP-R base formulation containing a silane coupling agent and a medium thermal carbon black filler. The silane A187 used is available from Union Carbide Corp. The composition of the LP-R base was as follows:

| LP-32C | 100 wt. parts |
| --- | --- |
| MT Black | 25 wt. parts |
| Silane A 187 | 2.5 wt. parts |

The proportions used and the results obtained are shown in Table 3.

TABLE 3

|  | TEST 5 | TEST 6 |
| --- | --- | --- |
| LP-R base | 127.5 | 127.5 |
| Suprasec VM021 | 9 | 12 |
| DBTL | 1.0 | 1.0 |

TABLE 3-continued

|  | TEST 5 | TEST 6 |
| --- | --- | --- |
| INDEX | 118 | 158* |
| POT LIFE (hrs) on 100 g | 2 | 1¾ |
| CURE TIME (hrs) for 2 mm thick sheet | 2½ | 2½ |
| PROPERTIES | GOOD ELASTOMER | GOOD ELASTOMER SLIGHT BLOWING |

*Higher isocyanate because moisture in LP-R ingredients.

EXAMPLE 3

Standard tests were carried out on an isocyanate cured LP-R polymer system in accordance with the invention and a conventional manganese dioxide cured system, to compare their mechanical properties. The composition of the isocyanate cured system was that of Test 5 in Example 2. A catalyst level of 1.0 phr DBTL was found to give equivalent properties to a standard manganese dioxide cure paste. An isocyanate index of 118 corresponds to an LP:NCO ratio of 100:9.

The test formulations and the results obtained are set out in Table 4.

TABLE 4

|  | Isocyanate system (1) | STD LP-R systems |
| --- | --- | --- |
| Part A |  |  |
| LP-32C | 100 | 100 |
| MT Black | 25 | 25 |
| Silane AP187 | 0.5 | 0.5 |
| DBTL | 1.0 | — |
| Part B |  |  |
| Suprasec VM201 | 9 | — |
| Manganese dioxide | — | 10 |
| Plasticiser HB40 | — | 10 |
| TMTD | — | 0.5 |
| % polysulphide polymer content | 75 | 69 |
| Elongation at break | 283% | 473% |
| Tensile Strength | 2.95 MPa | 2.04 MPa |
| Modulus at 200% | 1.5 MPa | 0.66 MPa |
| Tear Strength | 7.8 KNm | 7.6 KNm |
| Abrasion Resistance H18 Wheel 1000 g Top mass/ 100 cycles | 0 gs | 0.187 gs |
| Abrasion CS10 1000 g Top mass/ 1000 cycles | 0.033 gs | 0.645 gs |
| Compression set 25% compression, 72 hrs @ 70° C. (ES 903 Pt. A6) | 52.8% | 96.5% |

It can be seen from the table that the formulation of the invention has improved mechanical properties in several respects, notably in tensile strength and abrasion resistance.

The following further tests were carried out to compare the formulations of Example 3.

Volume swell tests were carried out on both formulations in a variety of solvents. The tests were carried out for one month at 25° C. in accordance with British Standard 903 Part A16. The results are shown in FIG. 1 of the accompanying drawings. These results show that isocyanate cure of liquid polysulphide give widely different values compared to conventional manganese cured systems.

WATER—The swell in the manganese cured systems is commonly believed to be due to the solubility of manganese salts. The results obtained would appear to support this theory as very little swell in distilled water was apparent in the isocyanate cured system.

TOLUENE—Volume swell of standard LP-R products appear to be quite large in dry toluene, but using an isocyanate cure system the amount of swell can be reduced by approximately 50%.

METHYLETHYL KETONE (MEK)—Polyurethanes generally swell badly in MEK and similarly with the LP-R/isocyanate system. It may be because of the urea linkages and the methane groups that this product swells more than the equivalent manganese dioxide cured system. It might be possible to reduce this swell by using an aliphatic isocyanate in place of the aromatic (MDI) used.

ASTM FUEL B—Slightly worse results were experienced for the isocyanate cured LP-R, probably for the same reasons given for MEK.

ASTM OIL 3—Resistance to oil appears to be similar for isocyanate and manganese dioxide cured systems.

| PEEL ADHESION TEST ON CONCRETE (BS4254) PEEL TEST (Pull at 50 mm/min) | | |
|---|---|---|
| | MANGANESE DIOXIDE | ISOCYANATE CURE |
| Average Peel Strength | 80N | 65N |
| Mode of Failure | Thin film adhesive | Thin film adhesive |

The manganese dioxide cured material appeared to adhere better to aggregate in the concrete whilst the isocyanate cured system appears to adhere better to the mortar. Both surfaces were unprimed, but were cleaned free of dust.

Adhesion to different substrates

Figure 2:
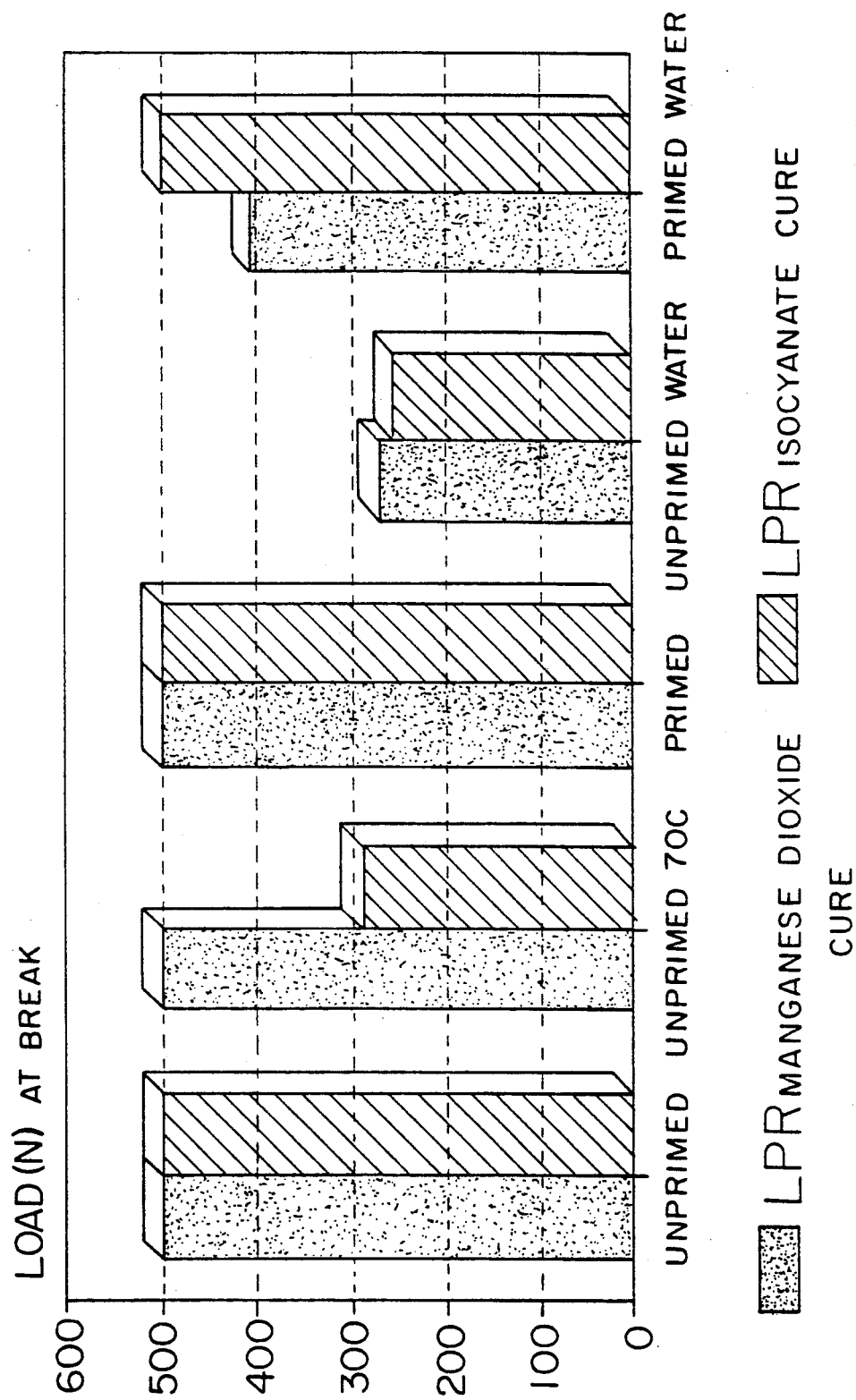
FIG. 2 is a bar chart illustrating the results of adhesion tests described in Example 3, in terms of stress at break.
Figure 3:
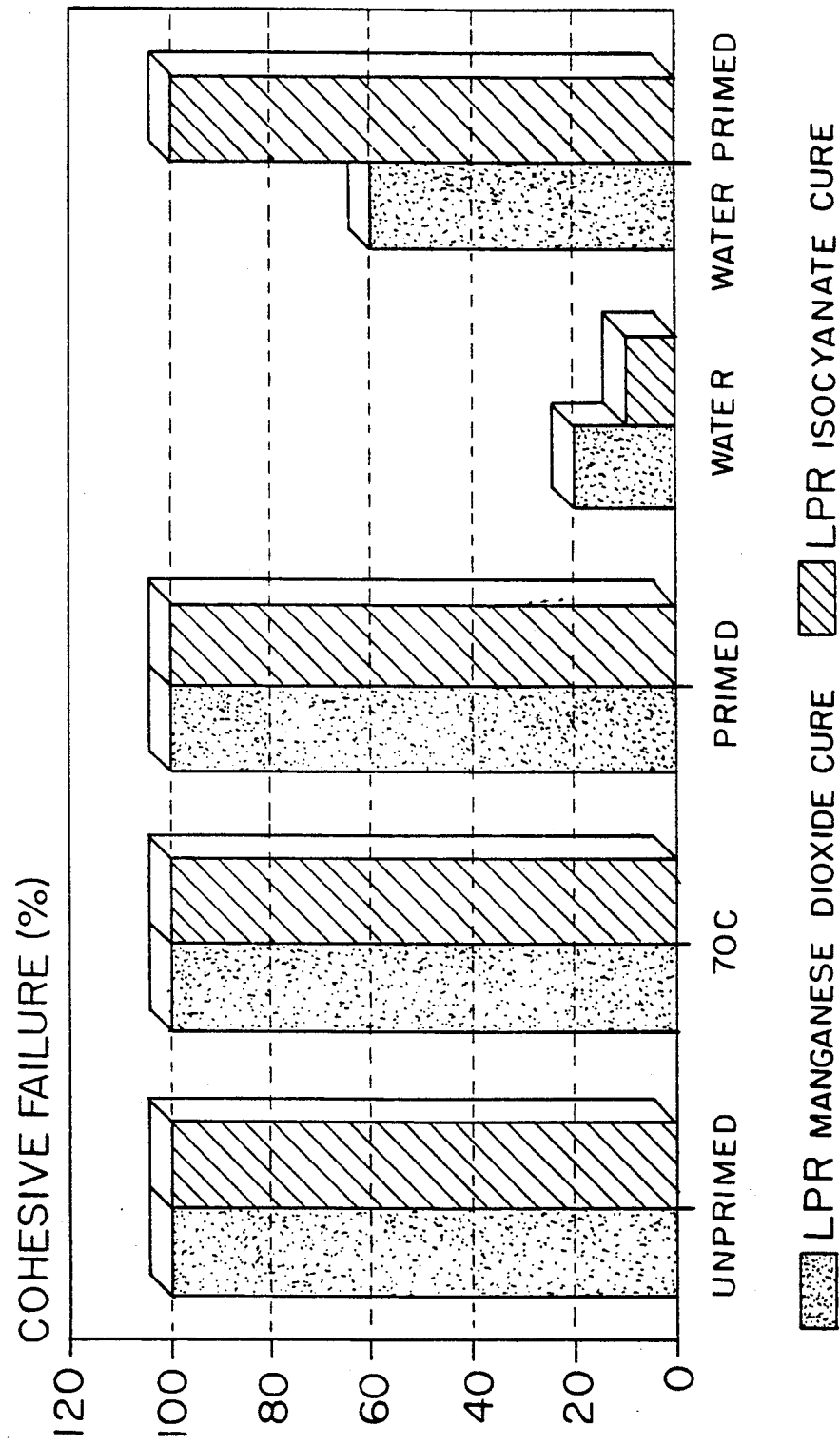
FIG. 3 is a bar chart illustrating the adhesion test results of Example 3 in terms of cohesive failure.

The adhesion of the manganese dioxide cured LP-R and isocyanate-cured LP-R to various substrates was studied. FIG. 2 shows the results for mortar in various states of preparation in terms of stress at break (BS4254). The results in terms of percentage cohesive failure are shown in FIG. 3. It can be seen that the results are in most cases comparable for the two cure systems. The isocyanate cured system was somewhat inferior in the case of unprimed mortar at 70° C., but there was some improvement for primed, water-immersed mortar. The adverse result at 70° C. for the isocyanate system may be due to an increase in the modulus with heat aging. This is supported by a cohesive failure rate of 100%.

The poorer performance for the manganese dioxide cured system in the case of a primed mortar immersed in water may be due to the swell in water observed with manganese-cured systems, leading to a reduction in strength.

The concrete primer used was baser on an isocyanate system, which might be expected to enhance compatibility with the isocyanate cured system.

Figure 4:
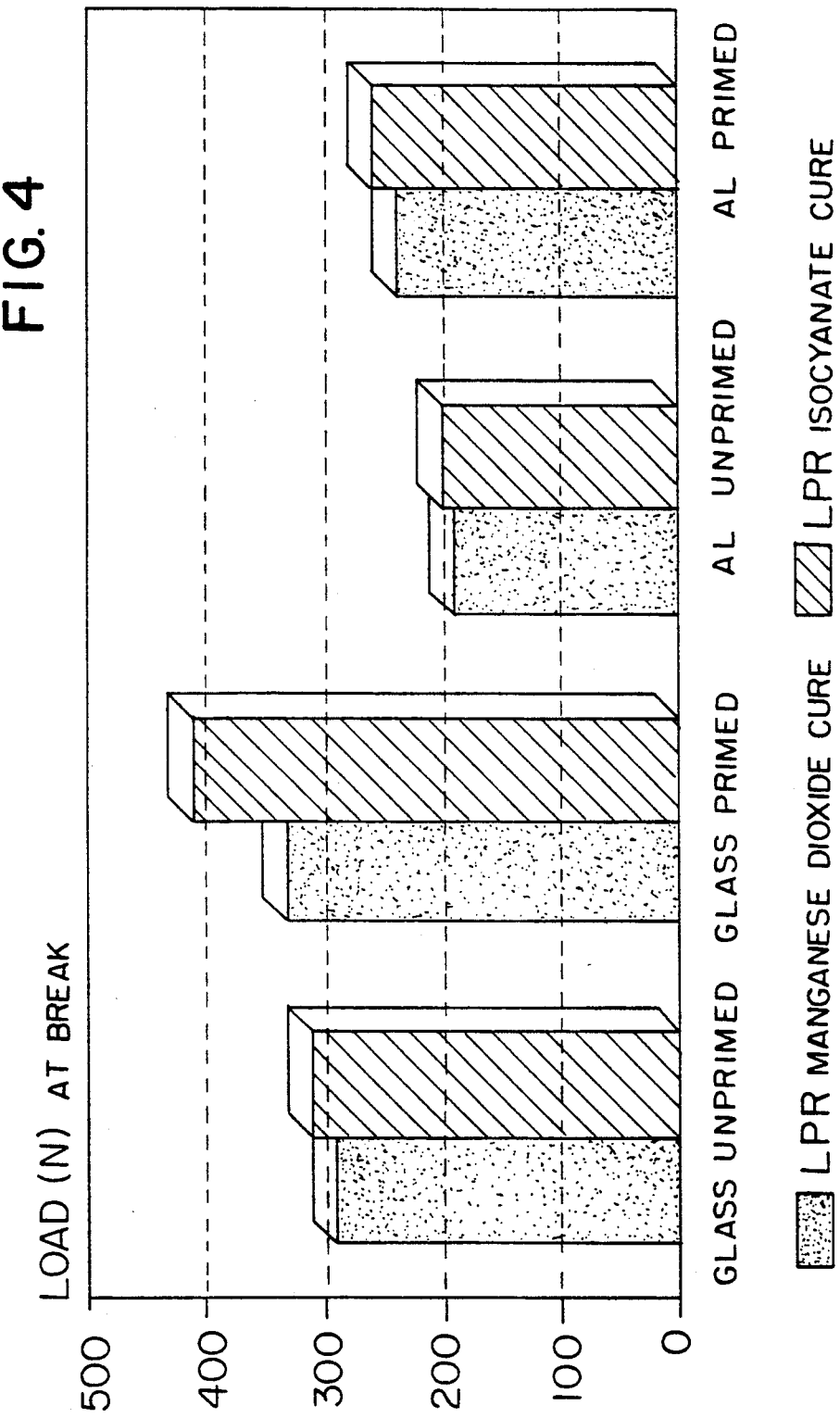
FIG. 4 is a bar chart illustrating the results of further adhesion tests, in terms of stress at break, comparing primed and unprimed substrates.
Figure 5:
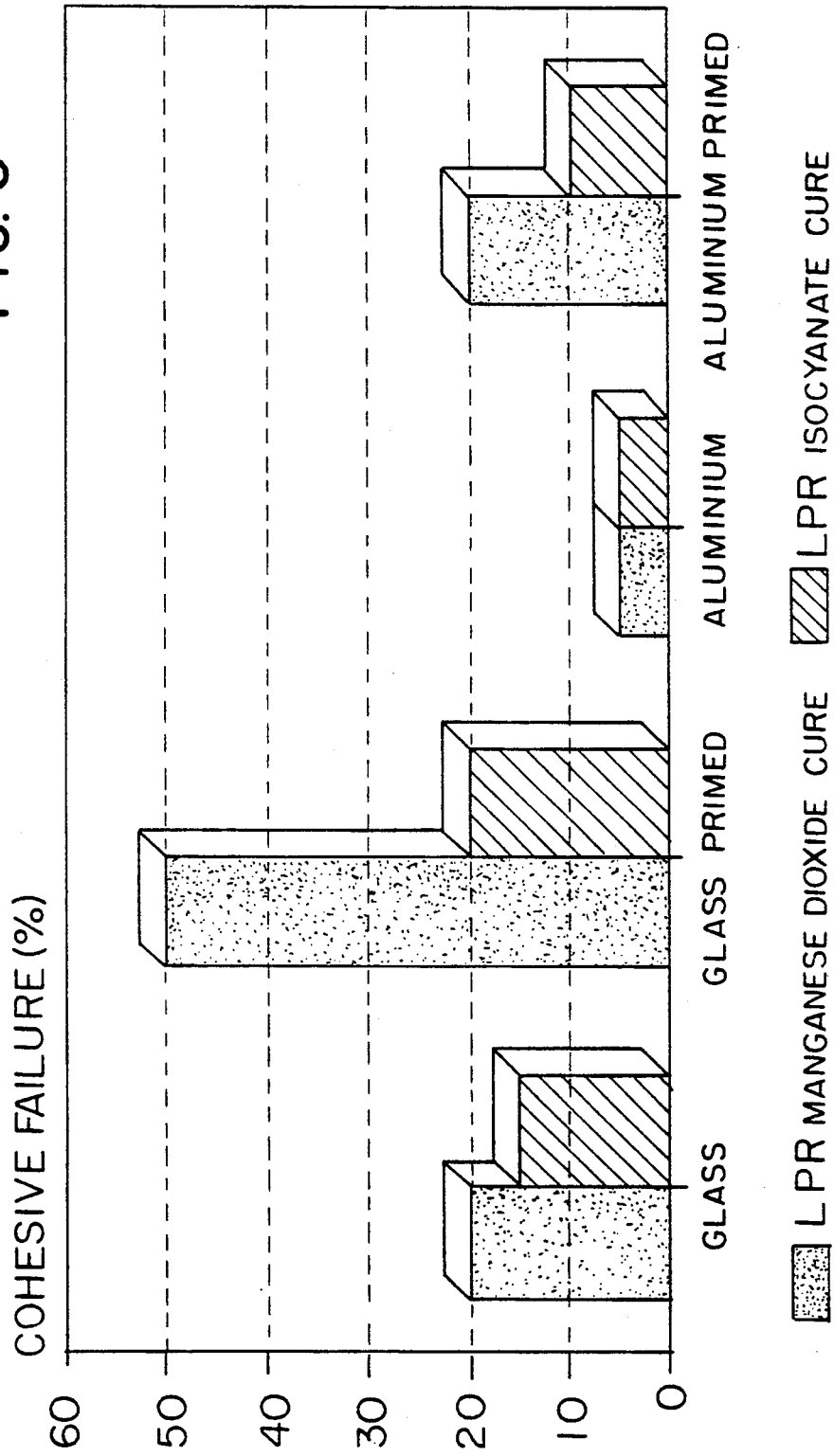
FIG. 5 is a bar chart illustrating the further adhesion tests of FIG. 4, in terms of cohesive failure.

FIGS. 4 and 5 of the drawings slow, in terms of total load and percentage cohesive failure respectively, comparisons of the adhesion of the standard and isocyanate cured systems to primed and unprimed glass and aluminium. It can be seen that in all cases the isocyanate cured system gave some improvement in total load. The cohesive failure rate was either the same or much reduced.

EXAMPLE 4

Higher strength LP compositions comprising 50 parts by weight of Printex 25 carbon black per 100 parts by weight of LP were made. One sample was cured with Suprasec VM021 isocyanate (isocyanate index 118) and one with manganese dioxide. The composition of the invention was found to have higher tensile strength, as can be seen from Table 5:

TABLE 5

| | Isocyanate system (2) | Std LP-R system (2) |
|---|---|---|
| LP-R 32C | 100 | 100 |
| Printex 25 | 50 | 50 |
| Silane | 0.5 | 0.5 |
| Suprasec VM021 | 9 | — |
| TMTD | — | 0.5 |
| Plasticiser | — | 10 |
| Manganese dioxide | — | 10 |
| Tensile Strength | 5.4 MPa | 4.8 MPa |

EXAMPLE 5

The curing of three formulations of isocyanate cured LP-R, having different contents of DBTL catalyst, was monitored and compared with that of the conventional manganese dioxide cured LP-R. The two formulations in accordance with Example 3 were compared with two additional isocyanate cured polymers having DBTL contents of 0.2 and 0.5 phr respectively.

Figure 6:
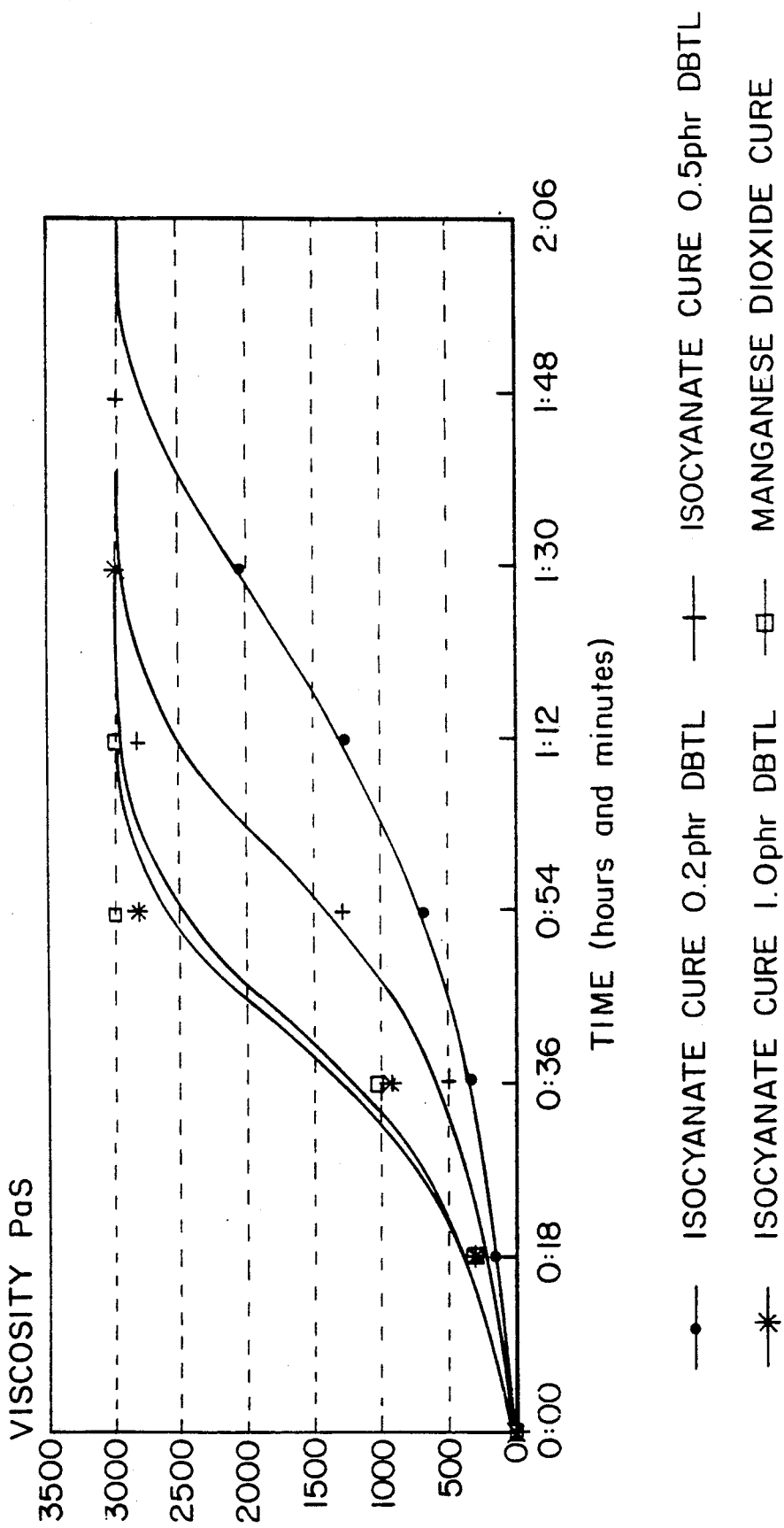
FIG. 6 illustrates the cure profiles of liquid polysulphide compositions using different cure accelerators.
Figure 7A:
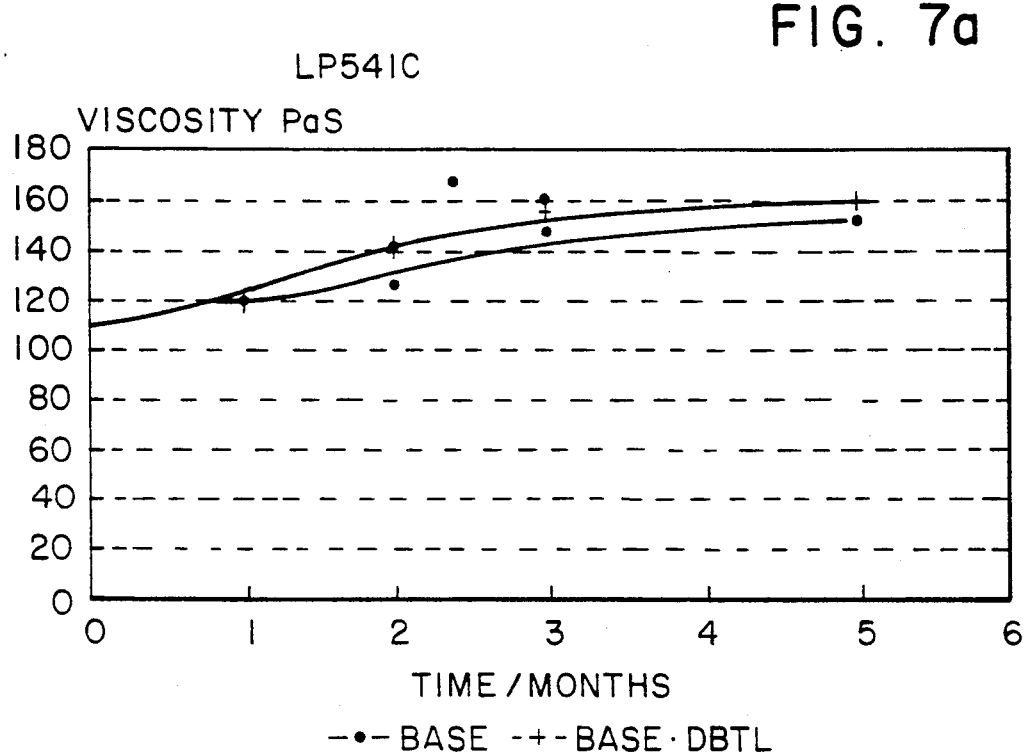
FIGS. 7a to 7d respectively illustrate the effect of aging on the viscosities of four compositions in accordance with the invention.
Figure 7B:
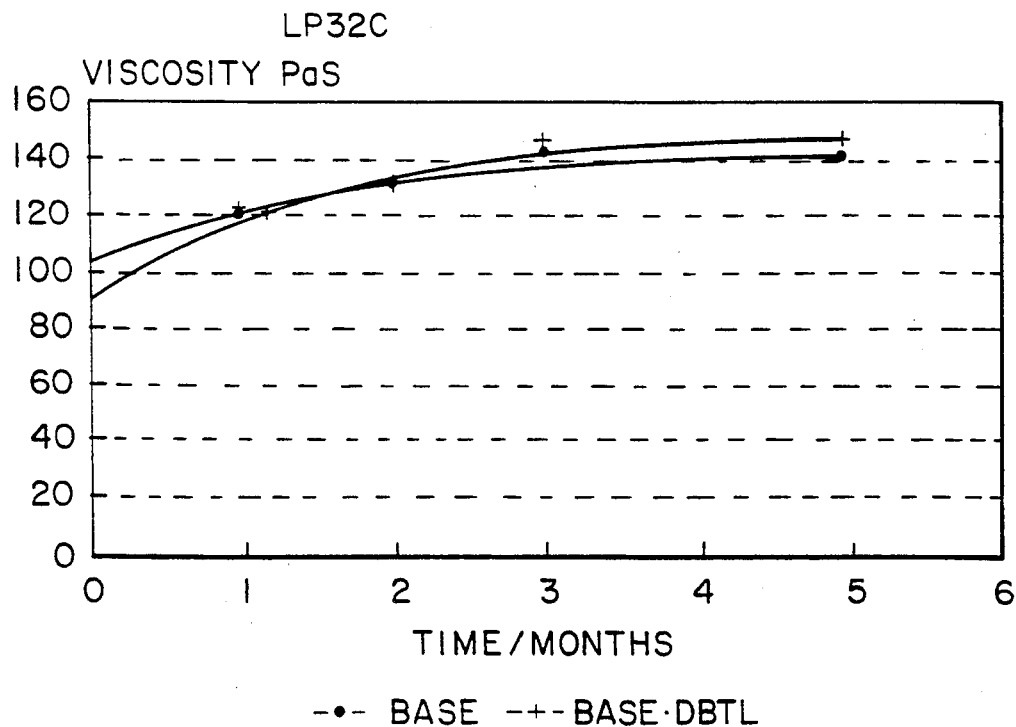
Figure 7C:
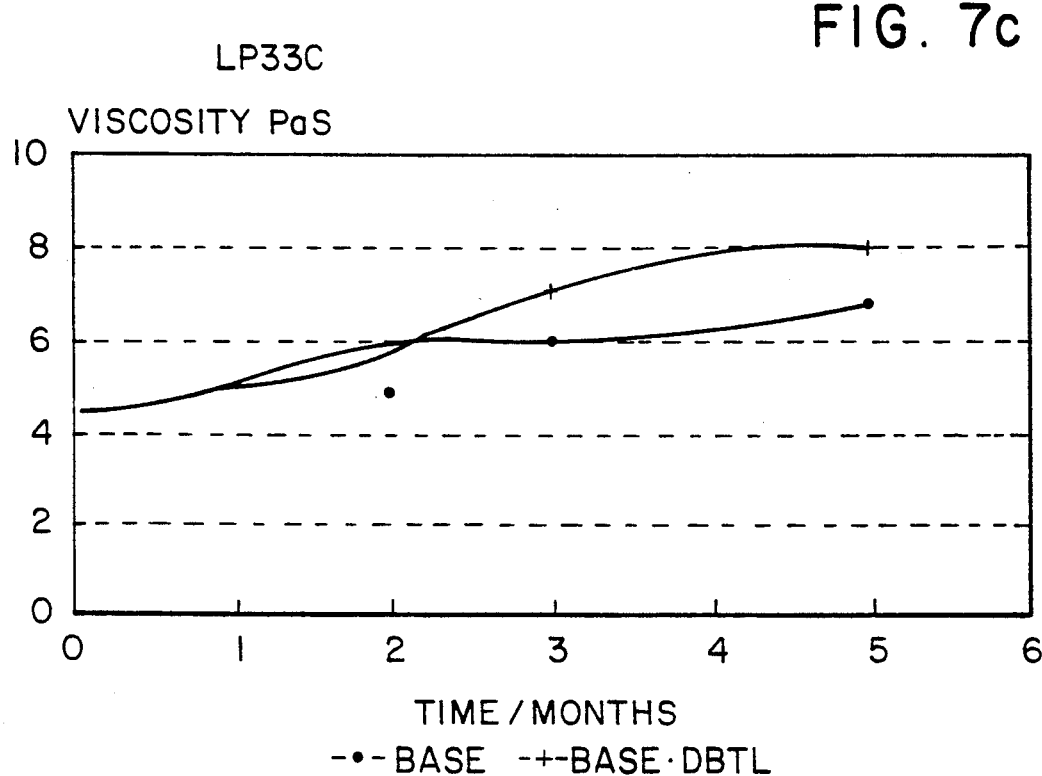
Figure 7D:
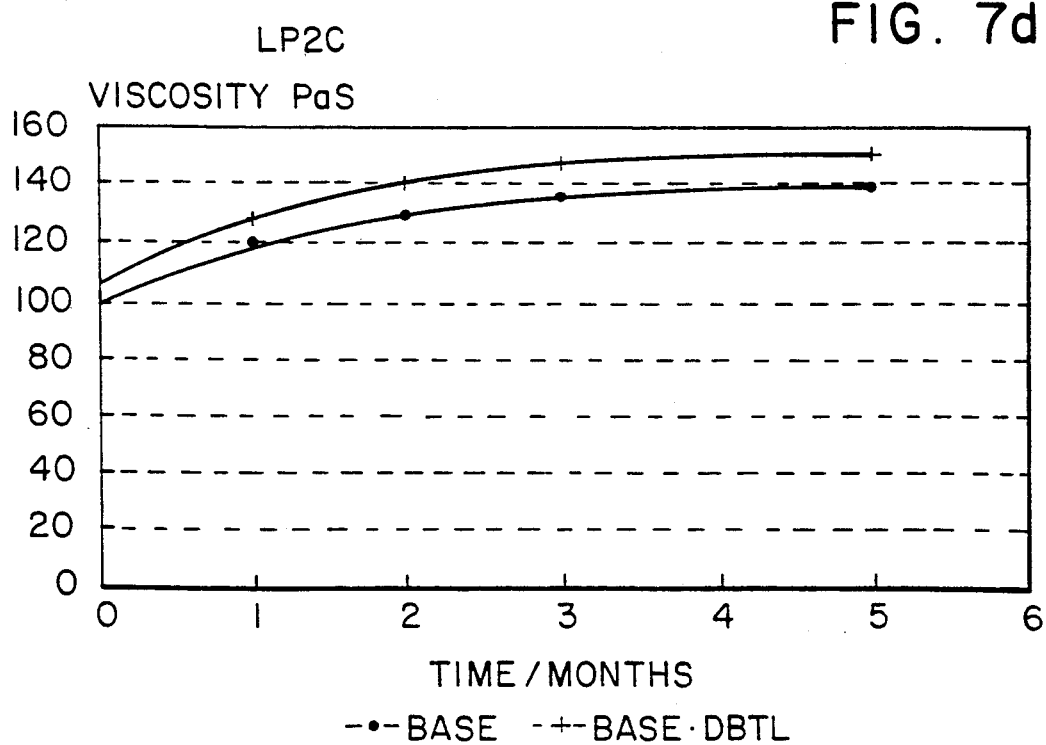

The results are shown in FIG. 6 of the drawings. For the purpose of this experiment, it is assumed that the composition being cured ceases to be workable when its viscosity reaches 2500 Pas. The time taken for this viscosity to be reached is known as the work life.

It can be seen from FIG. 6 that the work life can bs varied considerably by varying the amount of DBTL used. A DBTL content less than 0.2 phr does not give a satisfactory cure since the isocyanate tends to react with moisture in the system, leaving too few —NCO groups to react with mercaptan groups. This minimum content of DBTL gives a work life of just over 1 hour 30 minutes. The work life can also be lengthened by using lower molecular weight polymers or by using a less reactive isocyanate.

Increasing the content of DBTL will increase the cure rate, but levels higher than 1.0 phr have been found not to give a commensurate increase in the rate.

EXAMPLE 6

Samples of the standard and isocyanate cured systems of Table 4 (Example 3) were subjected to dynamic mechanical thermal analysis (DMTA), their modulus being monitored over a temperature range from −70 to +170° C. at frequencies of 1 and 10 HZ.

A first isocyanate cured sample was tested 3 days after initial curing. The result suggested a glass transition temperature Tg of −28° C. at 10 Hz, but further activity was noted as the product passed through the range from 30 to 80° C., where an increase in modulus was noted. This suggested some post-curing.

A further sample tested approximately 5 weeks after initial curing also showed a Tg of −28° C. at 10 Hz, but thereafter showed a constant in-phase dynamic modulus (E') if about 6.5 PA from 10 to 130° C., suggesting that curing was complete.

The sample cured with manganese dioxide was also tested approximately 5 weeks after initial curing and showed a Tg of −32° C. at 10 Hz, and a substantially constant dynamic modulus of about 6.5 PA over a range from 10° to 130° C., again suggesting complete curing.

EXAMPLE 7

The following formulation was made up to test its adhesion to glass:

|  | pbw |
|---|---|
| Part A | |
| Polysulphide LP-32C | 100 |
| Catalyst DBTL | 1 |
| Part B | |
| Isocyanate (MDI) VM021 | 8 |

A relatively low level of isocyanate was used to reduce blowing. The LP/catalyst mixture was found to be stable for 3 months or more. This was thoroughly mixed with the MDI and the mixture applied onto clear glass with a spatula as a thin film. A second piece of glass was then applied as quickly as possible, being pressed from the center outwards to avoid entrapment of air.

Lap shear adhesion tests were carried out using pinch overlap specimens on unprimed glass. Also tested were a sample of thermoplastic polyurethane (TPU) and a further sample of the isocyanate cured polymer to which 0.5 pbw of a silane coupling agent was added. The results for the lap shear adhesion were as follows:

|  | TPU | Isocyanate cured LP | Isocyanate cured LP + Silane |
|---|---|---|---|
| Average | 0.461 MPa | 0.475 MPa | 0.64 MPa glass broke |

Samples of thermoplastic polyurethane, isocyanate cured LP and isocyanate cured LP plus silane were applied to glass plates and subsequently subjected to a ultra-violet light (Q.J.V.) test for 168 hours at 70° C., with an intermittent water cycle.

After this period the plates were examined visually and no sign of deterioration to the clear films was noted.

The plates were submitted to a further 1000 hours at 70° C. (with water cycle) and after this period all products had developed a brown tint.

The isocyanate cured polymer showed no thermoplanticity (ie would not flow between the pieces of glass) at 160° C. The TPU sample displayed melt flow at this temperature.

Although the inclusion of a silane coupling agent improved the adhesion it had the disadvantage of making the system cloudy.

EXAMPLE 8

To test the use of another aromatic isocyanate in the composition of the invention, a formulation was produced using toluene diisocyanate (TDI), Desmodur L67.

Desmodur L67 has 11.6 wt% of isocyanate groups in the dry polymer, so 7.77% in the solvented system. LP-32C has 1.75 wt% of SH groups, so 1.75 wt parts Desmodur L67 would be the stoichiometric amount required to cure 7.77 wt parts LP-32C, 22.5 wt parts Desmodur L67 to 100 wt parts LP-32C would give an isocyanate index of 100, so 26.55 wt parts are required to give an isocyanate index of 118.

The formulation was as follows:

| LP-32C | 100 wt parts |
|---|---|
| DBTL | 2 wt parts |
| Desmodur L67 | 26.5 wt parts |

After curing overnight and for a further 3 hours, a non-aerated product was obtained with little smell of polysulphide. Some residual solvent from the Desmodur L67 was present in the cured film, but this would not adversely affect its physical properties.

A rheometer trace for this composition at 35° C. for 90 minutes showed slight increase in modulus but not a full cure. At 110° C. the trace showed a sharp increase in modulus, reaching a maximum after about 4.5 minutes.

For comparison, a trace for the MDI isocyanate cured composition showed a substantially full cure after 90 minutes at 35° C.

EXAMPLE 9

To test a liquid polysulphide of lower molecular weight, a composition was made up using Morton International's Lp-3 (see Fable 1).

LP-3 has a mercaptan content of 2.06 mole/kg, or 6.8 wt%. Using Suprasec VM021 isocyanate with an average NCO content of 23%, 34 wt part of VM021 to 100 wt parts LP-3 give the required isocyanate index of 118.

| The composition was as follows: | |
|---|---|
|  | Phr |
| Polysulphide LP-3 | 100 |
| DBTL | 1.5 |
| VM021 | 34 |

A rheometer trace shows an increase in modulus to a maximum after about 70 minuets, although some mercaptan smell was noticed. The film had a tear strength superior to that of a manganese dioxidu-cured LP-3 film. These results indicated that little "back-biting" was occuring.

The isocyanate cured compositions of the present invention have been found to have properties which are in several respects superior to those of the standard manganese-dioxide cured LP's. A full comparison of the manganese dioxide and isocyanate cured LP-R's of Example 3 are shown in the following summary (Table 6).

TABLE 6

|  | manganese dioxide cured system | isocyanate cured system |
|---|---|---|
| Elongations at break | 473% | 283% |
| Tensile strength | 2.04 MPa | 2.95 MPa |
| Modulus @ 200% | 0.66 MPa | 1.5 MPa |
| Tear Strength | 7.6 KNm | 7.8 KNm |
| Abrasion Resistance H18 Wheel 1000 gms | 0.187 gs | 0 gs |
| CS10 100 gms | 0.645 gs | 0.033 gs |
| Hardness Shore A | 45 | 61 |
| Concrete Peel Strength (no primer) | 80N | 65N |
| Tg, DMTA 10 Hz | −30° C. | −24° C. |
| Work life range | 3 hrs 30 min | 3 hrs 30 min |
| Volume Swell 1 month 25° C. | | |
| WATER | 7.5% | 0.5% |
| TOLUENE | 30% | 15% |
| MEK | 7.5% | 28% |

TABLE 6-continued

| | manganese dioxide cured system | isocyanate cured system |
|---|---|---|
| ASTM FUEL B | 1% | 3% |
| ASTM OIL 3 | 1% | 1% |
| Tensile Adhesion (BS4254) | | |
| GLASS UNPRIMED | 290N | 310N |
| GLASS PRIMED | 320N | 410N |
| ALUMINIUM UNPRIMED | 190N | 200N |
| ALUMINIUM PRIMED | 240N | 260N |
| MORTAR UNPRIMED | 500N+ | 500N+ |
| MORTAR UNPRIMED 70° C. | 500N+ | 300N |
| MORTAR PRIMED | 500N+ | 500N+ |
| MORTAR UNPRIMED WATER | 260N | 250N |
| MORTAR PRIMED WATER | 410N | 500N+ |

EXAMPLE 10

To study the effect of variations in isocyanate functionality, LP functionality and LP molecular weight, a series of compositions was made up using different liquid polysulphides, and different isocyanates, as well as a series of reference compositions cured with manganese dioxide.

1. LP molecular weight was varied by using LP32C, LP980C and LP33C (which are 4000, 2600 and 1000 molecular weight respectively), and contain 0.5% Trifunctional monomer.
2. LP functionality was varied by using LP541C, LP32C and LP2C (which contain 0, 0.5 and 2.0 percent trifunctional monomer respectively) and are 4000 molecular weight.
3. Isocyanate functionality was varied by using Suprasec VM021, DND and VM90 (which have functionalities of 2.0, 2.7 and 2.9 respectively).

The polymers were formulated into LP-R products by compounding in 25pphr of Sevarcarb MT carbon black.

Curatives and accelerators were arded in the proportions as outlined in Table 7, wherein the compositions are designated from 1/A to 5/D, according to the LP and curative used. The properties of the LP's are set out in more detail in Table 1 above.

TABLE 7

| | 1/A | 1/B | 1/C | 1/D | 2/A | 2/B | 2/C | 2/D | 3/A | 3/B |
|---|---|---|---|---|---|---|---|---|---|---|
| BASE | | | | | | | | | | |
| 1 LP541C | 100 | 100 | 100 | 100 | — | — | — | — | — | — |
| 2 LP32C | — | — | — | — | 100 | 100 | 100 | 100 | — | — |
| 3 LP2C | — | — | — | — | — | — | — | — | 100 | 100 |
| 4 LP980C | — | — | — | — | — | — | — | — | — | — |
| 5 LP33C | — | — | — | — | — | — | — | — | — | — |
| MT Carbon Black | 25 | 25 | 25 | 25 | 25 | 25 | 25 | 25 | 25 | 25 |
| DBTL | 1 | 1 | 1 | — | 1 | 1 | 1 | — | 1 | 1 |
| CURATIVE | | | | | | | | | | |
| A VM90 | 8 | — | — | — | 8 | — | — | — | 9 | — |
| B VM 021 | — | 10 | — | — | — | 10 | — | — | — | 11.2 |
| C DND | — | — | 8 | — | — | — | 8 | — | — | — |
| D MnO$_2$ | — | — | — | 10 | — | — | — | 10 | — | — |
| HB 40 | — | — | — | 10 | — | — | — | 10 | — | — |
| TMTD | — | — | — | 0.5 | — | — | — | 0.5 | — | — |

| | 3/C | 3/D | 4/A | 4/B | 4/C | 4/D | 5/A | 5/B | 5/C | 5/D |
|---|---|---|---|---|---|---|---|---|---|---|
| BASE | | | | | | | | | | |
| 1 LP541C | — | — | — | — | — | — | — | — | — | — |
| 2 LP32C | — | — | — | — | — | — | — | — | — | — |
| 3 LP2C | 100 | 100 | — | — | — | — | — | — | — | — |
| 4 LP980C | — | — | 100 | 100 | 100 | 100 | — | — | — | — |
| 5 LP33C | — | — | — | — | — | — | 100 | 100 | 100 | 100 |
| MT Carbon Black | 25 | 25 | 25 | 25 | 25 | 25 | 25 | 25 | 25 | 25 |
| DBTL | 1 | — | 1 | 1 | 1 | — | 1 | 1 | 1 | — |
| CURATIVE | | | | | | | | | | |
| A VM90 | — | — | 12 | — | — | — | 24 | — | — | — |
| B VM 021 | — | — | — | 16 | — | — | — | 32 | — | — |
| C DND | 9 | — | — | — | 12 | — | — | — | 24 | — |
| D MnO$_2$ | — | 10 | — | — | — | 10 | — | — | — | 10 |
| HB 40 | — | 10 | — | — | — | 10 | — | — | — | 10 |
| TMTD | — | 0.5 | — | — | — | 0.5 | — | — | — | 0.5 |

TABLE 8

The cure profiles and physical properties of the cured compositions were evaluated, and the results are shown in Table 8 below.

| PROPERTY | 1/A | 1/B | 1/C | 1/D | 2/A | 2/B | 2/C | 2/D | 3/A | 3/B |
|---|---|---|---|---|---|---|---|---|---|---|
| WORK LIFE Minutes | 29 | 25 | 25 | 70 | 25 | 25 | 25 | 30 | 25 | 25 |
| CURE TIME Minutes | 100 | 85 | 100 | 120 | 95 | 85 | 100 | 75 | 60 | 60 |
| TENSILE STRENGTH MPa | 1.3 | 2.9 | 1.8 | 1.6 | 1.6 | 2.0 | 1.7 | 1.6 | 1.2 | 2.4 |
| TEAR STRENGTH KN/m | 2.4 | 8.2 | 3.3 | 8.9 | 2.7 | 6.2 | 3.6 | 7.3 | 3.2 | 7.9 |
| ELONGATION % | 50 | 150 | 100 | 400 | 50 | 150 | 50 | 300 | 30 | 100 |
| ABRASION WEIGHT LOSS | 0.8 | 0.8 | 1.0 | 5.0 | 2.0 | 0.8 | 1.0 | 3.6 | 1.2 | 0.6 |
| VOLUME SWELL WATER % | 0.4 | 0.6 | 0.6 | 18 | 1.0 | 1.8 | 1.2 | 17 | 0.3 | 0.8 |
| VOLUME SWELL TOLUENE % | 62 | 70 | 59 | 130 | 61 | 78 | 57 | 123 | 54 | 55 |
| HARDNESS SHORE A | 53 | 40 | 52 | 15 | 50 | 50 | 54 | 21 | 59 | 53 |
| VISCOSITY PaS | 100 | 100 | 100 | 110 | 105 | 105 | 105 | 95 | 105 | 105 |

TABLE 8-continued

The cure profiles and physical properties of the cured compositions were evaluated, and the results are shown in Table 8 below.

| PROPERTY | 3/C | 3/D | 4/A | 4/B | 4/C | 4/D | 5/A | 5/B | 5/C | 5/D |
|---|---|---|---|---|---|---|---|---|---|---|
| WORK LIFE Minutes | 22 | 25 | 58 | 48 | 55 | 10 | 100 | 60 | 100 | 10 |
| CURE TIME Minutes | 70 | 60 | 180 | 152 | 170 | 60 | 190 | 180 | 210 | 25 |
| TENSILE STRENGTH MPa | 1.4 | 1.4 | 1.3 | 2.2 | 1.5 | 1.6 | 1.1 | 1.4 | 1.4 | 1.2 |
| TEAR STRENGTH KN/m | 2.5 | 5.8 | 2.4 | 8.2 | 2.6 | 7.9 | 2.1 | 9.5 | 3.1 | 7.9 |
| ELONGATION % | 50 | 200 | 25 | 100 | 50 | 500 | 50 | 400 | 100 | 500 |
| ABRASION WEIGHT LOSS | 1.1 | 2.7 | 1.4 | 0.5 | 1.4 | 2.9 | 0.8 | 0.3 | 0.8 | 3.4 |
| VOLUME SWELL WATER % | 0.5 | 19 | 0.2 | 0.7 | 0.4 | 18 | 0.1 | 0.5 | 0.2 | 29 |
| VOLUME SWELL TOLUENE % | 61 | 80 | 51 | 56 | 52 | 121 | 58 | 44 | 39 | 157 |
| HARDNESS SHORE A | 54 | 30 | 61 | 49 | 59 | 26 | 47 | 41 | 47 | 20 |
| VISCOSITY PaS | 105 | 100 | 33 | 33 | 33 | 32 | 4 | 4 | 4 | 4.5 |

EXAMPLE 11

To evaluate the effect of variations in the content of curative, isocyanate-cured compositions A to C were made up using different amounts of curative, and their cure profiles and physical properties were compared to those of $M_nO_2$-cured reference compositions D to F, in which the amount of curative was also varied. The formulations and results are shown in Table 9.

TABLE 9

| Base | A | B | C | D | E | F |
|---|---|---|---|---|---|---|
| LP32C | 100 | 100 | 100 | 100 | 100 | 100 |
| MT Black | 50 | 50 | 50 | 50 | 50 | 50 |
| DBTL | 1 | 1 | 1 | — | — | — |
| Curative | | | | | | |
| Isocyanate | 10 | 8 | 12 | — | 1 | — |
| $M_nO_2$ | — | — | — | 10 | 8 | 12 |
| HB40 | — | — | — | 10 | 8 | 12 |
| TMTD | — | — | — | 1 | 0.8 | 1.2 |
| Work life (minutes) | 24 | 35 | 20 | 12 | 22 | 8 |
| Cure time (minutes) | 120 | 150 | 99 | 37 | 60 | 20 |
| Tear Strength Nmm$^{-1}$ | 14 | 7 | 12 | 9 | 10 | 11 |
| Tensile Strength MPa | 3.6 | 0.7 | 3.4 | 2.4 | 2.9 | 2.5 |
| Elongation at Break % | 300 | 600 | 200 | 400 | 200 | 300 |
| Abrasion Mg Weight Loss | 0.8 | 1.2 | 0.9 | 1.9 | 1.9 | 2.0 |

EXAMPLE 12

Figure 8:
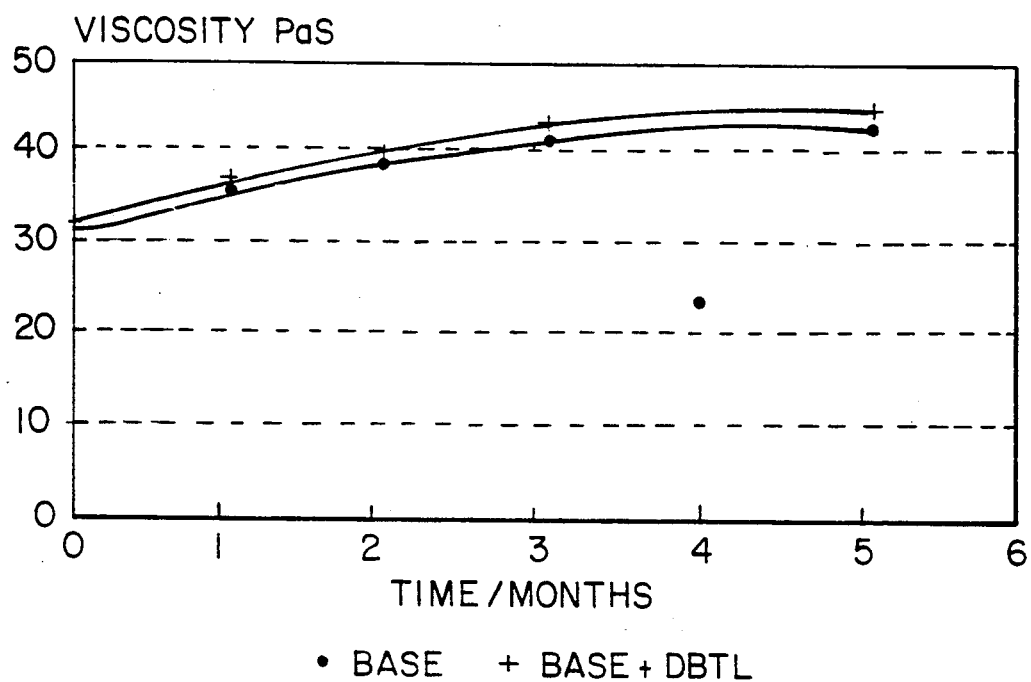
FIG. 8 illustrates the effect of aging on a further composition in accordance with the invention.

To study the effect of heat aging on the compositions of the invention and on the catalysts used, compositions were made up using five different liquid polysulphides, using isocyanate and conventional curatives as shown in Table 10. The compositions are heat aged for five months at 45° C. and their viscosities monitored. The results are shown graphically in FIGS. 7a to 7d for the compositions based respectively on LP541C, LP32C, LP33C and LP2C, and in FIG. 8 for the composition based on LP980C.

TABLE 10

| | LP33C LP-Rm | LP33C LP-Ri | LP980C LP-Rm | LP980C LP-Ri | LP32C LP-Rm | LP32C LP-Ri | LP541C LP-Rm | LP541C LP-Ri | LP2C LP-Rm | LP2C LP-Ri |
|---|---|---|---|---|---|---|---|---|---|---|
| BASE | | | | | | | | | | |
| LP33C | 100 | 100 | — | — | — | — | — | — | — | — |
| LP980C | — | — | 100 | 100 | — | — | — | — | — | — |
| LP32C | — | — | — | — | 100 | 100 | — | — | — | — |
| LP541C | — | — | — | — | — | — | 100 | 100 | — | — |
| LP2C | — | — | — | — | — | — | — | — | 100 | 100 |
| MT Carbon Black | 25 | 25 | 25 | 25 | 25 | 25 | 25 | 25 | 25 | 25 |
| DBTL | — | 1 | — | 1 | — | 1 | — | 1 | — | 1 |
| CURATIVES | | | | | | | | | | |
| HB40 | 10 | — | 10 | — | 10 | — | 10 | — | 10 | — |
| MnO$_2$ | 10 | — | 10 | — | 10 | — | 10 | — | 10 | — |
| TMTD | 0.5 | — | 0.5 | — | 0.5 | — | 0.5 | — | 0.5 | — |
| VMO21 | — | 10 | — | 10 | — | 10 | — | 10 | — | 10 |

For the conventional and isocyanate-cured compositions based on LP980C, the cure time and work life were measured at monthly intervals. The results are shown in Table 11.

TABLE 11

| | LP980C (LP-Ri) WORK LIFE/Min | LP980C (LP-Ri) CURE TIME/min | LP980C (LP-Rm) WORK LIFE/min | LP980C (LP-Rm) CURE TIME/min |
|---|---|---|---|---|
| Initial | 48 | 152 | 10 | 60 |
| 1 month | 54 | 165 | 10 | 85 |
| 2 months | 60 | 180 | 14 | 85 |
| 3 months | 65 | 195 | 14 | 85 |
| 5 months | 70 | 215 | 15 | 90 |

EXAMPLE 13

Two compositions, designated LP-Ri and LP-R$_m$, were made up to test the effect of long-term water immersion or manganese dioxide-cured (LP—R$_m$) and isocyanate cured (LP-Ri) compositions. The formulations were as follows:

|  | LP-Ri | LP-Rm |
|---|---|---|
| Base |  |  |
| LP32C | 100 | 100 |
| MT Black | 25 | 25 |
| Silane A187 | 0.5 | 0.5 |
| DBTL | 1.0 | — |
| Curative |  |  |
| MnO$_2$ | — | 10 |
| HB40 | — | 10 |
| TMTD | — | 0.5 |
| VM021 | 10 | — |

The cured compositions were immersed in water for 458 days, after which their physical properties were compared. The results were as follows:

|  | LP-Ri | LP-Rm |
|---|---|---|
| 1. Mass Loss |  |  |
| 3 hours in vacuum at 70° C. % Mass Loss | 0.8 | 7.0 |
| 2. Hardness Shore A |  |  |
| Initial | 61 | 45 |
| Wet after 458 days | 61 | 31 |
| Dried after 458 days | 61 | 48 |
| Change Initial → Wet | 0% | −31% |
| Change Initial → Dried | 0% | +7% |
| 3. Specific Gravity |  |  |
| Initial | 1.34 kg/ltr | 1.36 kg/ltr |
| Wet after 458 days | 1.34 kg/ltr | 1.22 kg/ltr |
| Dried after 458 days | 1.35 kg/ltr | 1.40 kg/ltr |
| Change Initial → Wet | 0% kg/ltr | −14% kg/ltr |
| Change Initial → Dry | +0.7% kg/ltr | +3% kg/ltr |
| Lost material | 1.43 kg/ltr | 0.986 kg/ltr |
| 4. Manual Observations |  |  |
| Both systems evaluated were still elastomeric when wet, but LP-Ri compared more favourably with the dry control. The dried system LP-Ri appeared to be identical to the dry control. |  |  |
| 5. Volume Swell |  |  |
| After 458 days | 3.2% | 62% |

Figure 9:
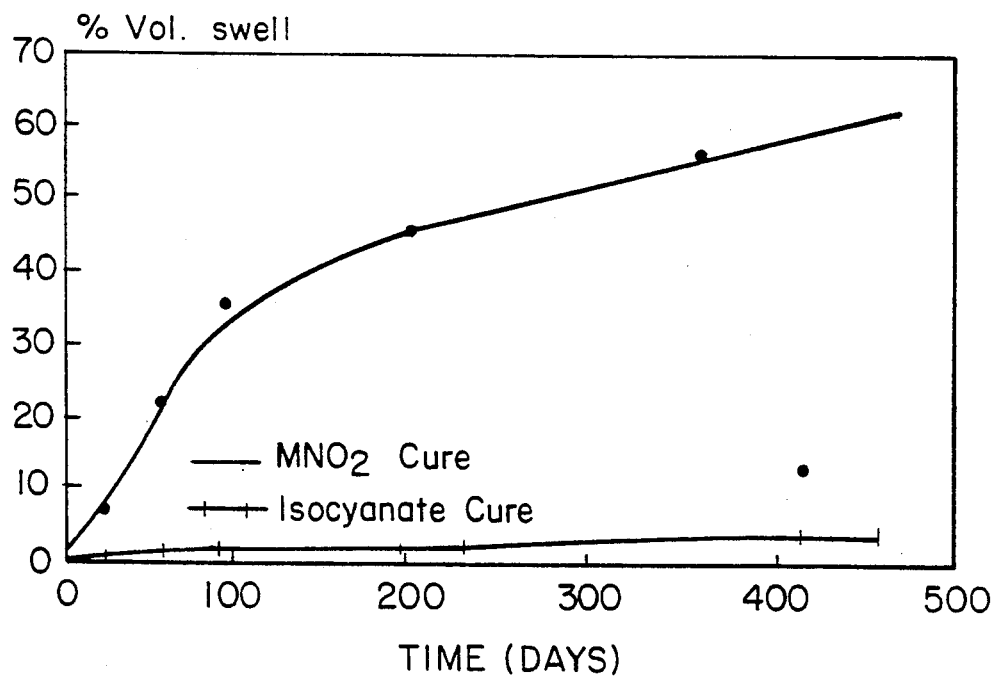
FIG. 9 is a graph comparing the volume swell upon long-term water immersion for isocyanate-cured and conventional LP compositions.

The degree of volume swell was measured at intervals during the immersion. The results are shown in FIG. 9, wherein it can be seen that while there is very considerable volume swell in the conventional composition, that exhibited by the composition of the invention is almost negligible.

The significant loss of mass in the LP—R$_m$ sample is thought to be due to loss of the HB40 curative, the specific gravity of which is close to that measured for the lost material.

EXAMPLE 14

Rectangular box section polycarbonate tubing was fixed mechanically around existing windows to form frames to which polycarbonate sheets were adhesively bonded, using a two-part polysulphide composition formulated as follows:

|  | pbw |
|---|---|
| Part A |  |
| Polysulphide LP32C | 100 |
| Stanclere DBTL catalyst | 1 |
| Part B |  |
| Isocyanate curative Suprasec VM021 | 8 |

The two components were mixed thoroughly. A thin adhesive film of the mixture was applied &o the face of the polycarbonate box section. Soon afterwards a clean section of polycarbonate sheet was placed onto the adhesive film. After initial consolidation the material as allowed to cure with no further clamping of the polycarbonate sheet. The bond cured to handling strength in 1½ hours.

The adhesive composition of the invention was found to give a good bond, resulting in cohesive failure when tested for bond strength. The bond had sufficient flexibility to accommodate the polycarbonate movement, and there was no stress crazing of the polycarbonate sheet. The adhesive composition was clear and gave a translucent layer between the bonded components.

Being a two-part composition, the adhesive of this example has a very long shelf life.

EXAMPLE 15

A one-part composition was made up for application to a polycarbonate window covering system similar to that of Example 14. The composition was made up as follows:

|  | pbw |
|---|---|
| LP-32C | 100 |
| Stanclere DBTL | 1 |
| Isocyanate VM 021 | 16 |

The polysulphide had been dried by the addition, several days earlier, of molecular sieve. The above components were mixed together under nitrogen and stored in a sealed container. The mixture had a shelf life of about two weeks.

A sample was taken from the container and a thin film was applied with a spatula to a face of the polycarbonate box section tubing. The adhesive was left for 10 minutes and a clean section of polycarbonate sheet was then placed onto it. After initial consolidation the material was allowed to cure with no further clampinq. It cured to handling strength overnight.

The system gave a rigid bond, with cohesive failure, but had enough flexibility to accommodate the polycarbonate movement. The adhesive was clear and the bonding layer translucent. There was no stress crazing of the polycarbonate.

EXAMPLE 16

Four compositions were made up to test the bonding properties of the compositions of the invention. Composition 1 was a conventional manganese dioxide-cured composition while compositions 2 to 4 were in accordance with the invention. The compositions were as shown in Table 12:

TABLE 12

| Component | Description | Composition 1 (Ref) | 2 | 3 | 4 |
|---|---|---|---|---|---|
| LP32C | Liquid polysulphide | 100 Pbw | 100 Pbw | 100 Pbw | 100 Pbw |
| L2550 | aliphatic isocyanate | — | 8 | — | 8 |
| VM021 | aromatic isocyanate | — | — | 8 | — |
| MnO$_2$ | catalyst | 10 | — | — | — |
| HB40 | plasticiser | 10 | — | — | — |
| TMTD | accelerator | 0.5 | — | — | — |
| Silane A187 | adhesion promoter | — | — | 1.6 | 1.6 |
| DBTL | catalyst | — | 1.0 | 1.0 | 2.0 |

Figure 10:
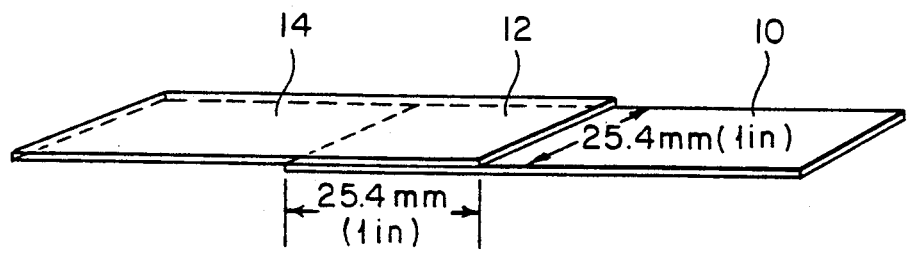
FIG. 10 shows a lap shear bond illustrating the bonding of polycarbonate sheets.

Each composition was mixed and a film of it was applied as shown in FIG. 10, to a polycarbonate strip 10 to form a 25.4mm (1 in.) square film 12. A second polycarbonate strip 14 was placed over the adhesive film and consolidated to form a lap shear bond. Each bond thus formed was allowed to stand for one week at 23° C. and 50% relative humidity.

The bonds were tested by pulling at 5mm/min. on a universal tensile testing machine. The results, together with other physical properties of the adhesive and of the bonds made by them, are shown in Table 13:

TABLE 13

| Property | Formulation | | | |
|---|---|---|---|---|
| | 1 (Ref) | 2 | 3 | 4 |
| Pot Life | 30 mins | 60 mins | 30 mins | 60 mins |
| Shear strength MPA | 0.416 MPa | 0.512 MPa | 0.504 MPa | 0.549 MPa |
| Elongation at break | 12% | 15% | 35% | 30% |
| Cohesive failure | 0% | 80% | 75% | 100% |
| Colour | opaque | transparent | translucent | translucent |
| stress crazing | none | none | none | none |

It can be seen from the table that all three compositions in accordance with the invention offer a number of advantages over the conventional composition 1. While the latter gives an opaque film, composition 2 gives a transparent one with good stability to UV light owing to the use of an aliphatic isocyanate, and in compositions 3 and 4 the transparency is only slightly reduced by the inclusion of a silane coupling agent. Furthermore, all three compositions of the invention have much improved adhesive properties.

EXAMPLE 17

A polysulphide composition was made up as follows, to provide a non-slip coating on polycarbonate sheets:

| Component | Pbw |
|---|---|
| Liquid Polysulphide: LP-31 | 100 |
| Catalyst: DBTL (Anchor Chemicals Ltd) | 2 |
| Curative: MDI (pba 2271, ICI) | 8.5 |
| Solvent: Methyl ethyl ketone (MEK) | 27.5 |

The LP-31 had a mercaptan content of 1.46% and the MDI curative had an isocyanate content of 23%. Stoichiometric proportions of these components would be 100 wt. parts LP : 8.1 wt. parts MDI. In practice however a slight excess of MDI was used, giving an isocyanate index of 105, to enhance adhesion to the polycarbonate and to allow for reaction with any moisture within the system. The higher molecular weight LP and relatively high DBTL content were selected with a view to achieving a cure within 3 minutes at 110° C. The MEK solvent was dried over molecular sieve.

The liquid polysulpyhide, catalyst and MDI were thoroughly mixed. The pot life of the mixture was measured by the cup and stick method and found to be 20 minutes at 23° C. and 50% relative humidity.

A spray coating composition was made up by adding the MEK solvent and sprayed onto polycarbonate sheets using a Binks BBA gun fitted with an AS17 air cap and suction feed cup, at a spray pressure of 310 kPa (45 psi). This gave a desirable "orange peel" effect, giving better anti-slip properties than "flat" coatings.

Three coatings were sprayed to the thicknesses shown:

| Coating | A | 0.005 mm |
|---|---|---|
| | B | 0.015 mm |
| | C | 0.027 mm |

The film thickness of coating A was found not to give adequate anti-slip properties, and this coating was not tested further. Coatings B and C were tested, as described below, for cure, transparency, blocking and anti-slip properties.

Two further coatings were prepared by casting the above mixture of LP-31, DBTL catalyst anti MDI curative, without the solvent onto polycarbonate sheets, using an adjustable doctor knife applicator. The coating thicknesses were as follows:

| Coating | D | 0.1 mm |
|---|---|---|
| | E | 0.4 mm |

The cure was evaluated for coatings B to E, using the standard "crosshatch" (sellotape) text, immediately after curing at 110° C. for 3 minutes. There was no transfer with any of the samples.

Further samples of coating C were submitted to a 5 minutes boiling water test and examined for delamination (samples were tested at 40 minutes, 20 minutes, 10 minutes, 5 minutes and 1 minute after heat cure). No delamination was found with any sample.

A sample of the unsolvented mixture was subjected to D.S.C. testing to determine the extent of the cure. The sample was heated between 25° C. and 110° C. in two minutes and maintained isothermally at 110° C. for a further 10 minutes. Most curing activity appeared to be finished within 2½ minutes from the start of the cycle and all activity appeared to be complete after 2 minutes at 110° C.

20 x 30 cm polycarbonate sheets with cured coatings B, C, D and E were also tested for blocking by taking them directly from the 110° C. oven after curing and stacking them with a 5 kg weight force applied. The sheets were found to be non-blocking.

Coatings B, C and D were transparent, while the thicker coating E was translucent.

EXAMPLE 18

Figure 11:
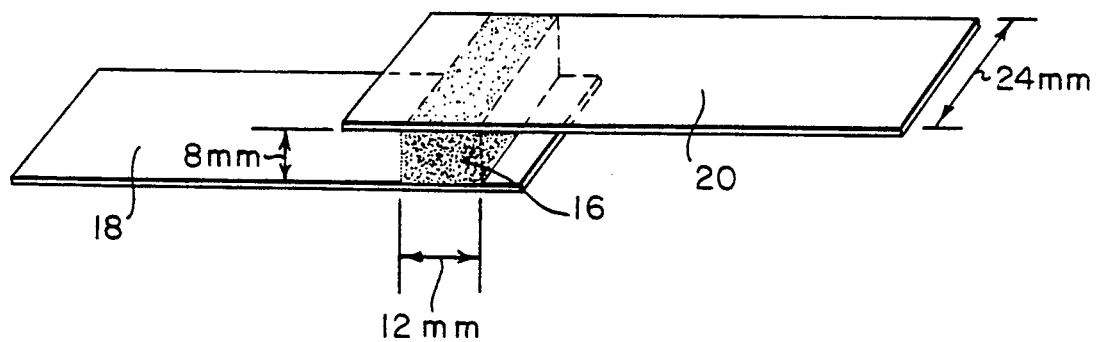
FIG. 11 shows a lap shear bond illustrating the use of a composition of the invention as a sealant for polycarbonate sheet.

The formulation shown in Table 14 was mixed and applied to a lap shear bond as shown in FIG. 11. A seal 16, having a thickness of 8mm and a width of 12mm, was formed between two 24mm wide polycarbonate sheets 18, 20.

TABLE 14

| Ingredient | Description | quantity by weight |
|---|---|---|
| LP 980C | Polysulfide polymer | 100 |
| MT Carbon Black | Filler | 25 |
| DBTL | Catalyst | 1 |
| PRA 2271 (MDI) | Isocyanate curative | 10 |

Physical properties were recorded as follows using a standard tensometer with a shear rate of 50 mm/min.

| Average Shear Strength = | 0.833 MPa |
|---|---|
| Average elongate at Break = | 50% |

Cohesive failure = 100%

While DBTL has been used as the catalyst in the exemplified compositions, it will be appreciated that other organometallic catalysts can be used, and in particular other alkyltin laurates such as tributyltin laurate.

What is claimed is:

1. A method of curing a liquid polysulphide resin which comprises reacting the liquid polysulphide with an isocyanate curing agent in the presence of a catalyst selected from organometallic compound and metal salts, wherein the isocyanate curing agent has a isocyanate functionality of at least two.

2. A method according to claim 1 wherein the catalyst is an organotin compound.

3. A method according to claim 2 wherein the catalyst is an alkyltin laurate.

4. A method according to claim 3 wherein the catalyst is dibutyltin dilaurate.

5. A method according to claim 1 wherein said catalyst is used in a amount from 0.7 to 2 weight parts per 100 weight parts of liquid polysulphide.

6. A method according to claim 1 wherein said liquid polysulphide has an average molecular weight in the range from 2500 to 8000.

7. A method according to claim 1 wherein the liquid polysulphide has a trifunctional monomer content of not more than about 1 mole %.

8. A method according to claim 1 wherein the liquid polysulphide has an average structure of the formula:

$HS-(C_2H_4-O-CH_2-O-C_2H_4-O-C_2H_4-S-S)_n-C_2H_4-O-CH_2-O-C_2H_4-SH$ wherein n is in the range from 5 to 50.

9. A method according to claim 1 wherein the isocyanate is an aromatic isocyanate.

10. A method according to claim 9 wherein the aromatic isocyanate is selected from diphenyl methylene-4,4'-diisocyanate (MDI) and toluene diisocyanate.

11. A method according to claim 1 wherein the isocyanate is an aliphatic isocyanate.

12. A method according to claim 11 wherein the aliphatic isocyanate is hexamethylene diisocyanate.

13. A method according to claim 1 wherein the isocyanate is mixed with the liquid polysulphide in an amount such as to give an isocyanate index of 100 to 135.

14. A method according to claim 13 wherein the isocyanate index is from 110 to 125.

15. A method according to claim 1 wherein carbon black is added to the composition.

16. A method according to claim 1 wherein the liquid polysulphide composition containing the isocyanate and the catalyst is applied to a polycarbonate member and cured in contact therewith.

17. A method according to claim 16 wherein the polysulphide composition is applied and cured in the form of a coating.

18. A method according to claim 17 wherein the polysulphide composition is applied as a clear coating to a polycarbonate sheet the curing agent being an aliphatic isocyanate.

19. A method according to claim 16 wherein the polysulphide composition is applied as an adhesive to bond the said polycarbonate member to another member.

20. A method as claimed in claim 16 wherein the polysulphide is applied as a sealant around the polycarbonate member.

21. A two-part curable liquid polysulphide resin composition comprising as a first component a liquid polysulphide and a catalyst selected from organometallic compounds and metal salts and as a second component an isocyanate curing agent.

22. A two-part composition according to claim 21 wherein the curing agent is an aromatic isocyanate.

23. A two-part composition according to claim 22 wherein the curing agent is selected from toluene diisocyanate and diphenyl methylene-4,4'-diisocyanate.

24. A two-part composition according to claim 21 wherein the curing agent is an aliphatic isocyanate.

25. A two-part composition according to claim 24 wherein the curing agent is hexamethylene diisocyanate.

26. A two-part composition according to claim 18 wherein the catalyst is an organotin compound.

27. A two-part composition according to claim 26 wherein the catalyst is an alkyltin laurate.

28. A two-part composition according to claim 27 wherein the catalyst is dibutyltin dilaurate.

29. A two-part composition according to claim 18 wherein the catalyst is present in an amount of 0.7 to 2.0 weight parts per 100 weight parts of liquid polysulphide.

30. A two-part composition according to claim 18 wherein the liquid polysulphide has an average molecular weight in the range from 2500 to 8000.

31. A two-part composition according to claim 18 wherein the liquid polysulphide has a trifunctional monomer content of not more than about 1 mole%.

32. A two-part composition according to claim 18 wherein the liquid polysulphide has an average structure of the formula:

$HS-(C_2H_4-O-CH_2-O-C_2H_4-S-S)_n-C_2H_4-O-CH_2-O-C_2H_4-SH$ wherein n is in the range from 5 to 50.

33. A two-part composition according to claim 18 wherein the liquid polysulphide component further comprises carbon black.

34. A two-part composition according to claim 18 wherein the liquid polysulphide component further comprises a silane coupling agent.

35. An isocyanate-curable polysulphide resin composition comprising a liquid polysulphide resin and an organotin catalyst.

36. A composition according to claim 35 wherein the catalyst is an alkyl tin laurate.

37. A composition according to claim 36 wherein the catalyst is dibutyl tin dilaurate.

38. A composition according to claim 35 wherein the catalyst is present in an amount of 0.7 to 2.0 weight parts per hundredweight parts of liquid polysulphide.

39. A composition according to claim 35 wherein the liquid polysulphide has an average molecular weight in the range from 2500 to 8000.

40. A composition according to claim 35 wherein the liquid polysulphide has a trifunctional monomer content of not more than about 1 mole%.

41. A composition according to claim 35 wherein the liquid polysulphide has an average structure of the formula:

$HS-(C_2H_4-O-CH_2-O-C_2H_4-S-S)_n-C_2H_4-O-CH_2-O-C_2H_4-SH$ wherein n is in the range from 5 to 50.

42. A composition according to claim 35 further comprising carbon black.

43. A composition according to claim 35 further comprising a silane coupling agent.

* * * * *